United States Patent Office 2,842,480
Patented July 8, 1958

2,842,480

PREPARATION OF THROMBOPLASTIN

Heron O. Singher, Plainfield, and Emanuel A. Swart, Somerville, N. J., assignors to Ortho Pharmaceutical Corporation, a corporation of New Jersey No Drawing. Application May 27, 1954
Serial No. 432,898

7 Claims. (Cl. 167—74)

This invention relates to a method for the preparation of thromboplastin and more particularly relates to a method for the extraction of thromboplastin from rabbit brain or lung tissue or a mixture thereof.

Thromboplastin has accepted value for use in the determination of prothrombin time, which is a measure of the amount of prothrombin present in a tested blood sample. The determination of prothrombin time is useful clinically, for the fact that it varies with a variety of clinical situations has been well established. It is known that vitamin deficient diets may result in prolonged prothrombin time. Biliary diseases frequently result in prolonged time and are considered to be related to impaired vitamin K absorption. Impaired liver function results in prolongation of prothrombin time. A variety of drugs such as the salicylates and especially Dicumarol affect the prothrombin time to a degree considered sufficient to be of clinical significance.

The two-stage theory of Morawitz for the mechanism of blood coagulation postulates, as a first stage, the interaction of prothrombin, calcium ion, and thromboplastin which results in the formation of thrombin and, as a second stage, the reaction of thrombin with fibrinogen to form fibrin. Fibrin fibers are largely responsible for the characteristic properties of clotted blood. It has been shown that the addition to blood of small amounts of thromboplastin can accelerate clotting time, generally referred to as prothrombin time, from the usual several minutes down to a few seconds. Thromboplastin, otherwise known as the platelet-tissue factor, is essential to the blood clotting mechanism but has not been definitely identified chemically. The mechanism of the activity and function of thromboplastin in blood clotting is not settled but most workers believe it to be enzymatic and that thromboplastin acts to catalyze the conversion of prothrombin to thrombin probably through an intermediate prothrombin-thromboplastin-calcium complex. Since thrombin is a protein essential to the formation of fibrin and thromboplastin is necessary for the conversion of prothrombin to thrombin, the measurement of prothrombin time, wherein a standardized preparation of thromboplastin is used, has come to be considered as yielding information of great clinical value.

It is an object of this invention to provide an improved thromboplastin product.

It is another object of this invention to provide a method for preparing a standardized preparation of thromboplastin having activity predictable on the basis of determinations carried out with the particular preparation of thromboplastin.

It is another and further object of this invention to provide a method for the preparation of thromboplastin of high activity for use in determining blood clotting time.

Other objects and particular advantages of the invention will be apparent from the following description and exemplary disclosures.

The objects of this invention are accomplished by a process in which thromboplastin is extracted from finely divided rabbit brain or lung tissue or from a mixture of these tissues with a buffered aqueous alcohol solution containing a low molecular weight amino acid and subsequent dialysis of the extracting solution containing thromboplastin against distilled water to remove low molecular weight inactive materials such as amino acid salts and inorganic salts. Rabbit brain or lung tissue or a mixture of the two may be finely divided by any suitable means such as a Waring blender which homogenizes the tissue. It is preferred, in order that the yield of thromboplastin be efficient and destruction of thromboplastin at a minimum, for the tissue to be finely divided or homogenized at a temperature not above 25° C. and preferably within the range of from —5° to 25° C. and that the step of finely dividing or homogenizing the tissue be accomplished in the presence of the extracting solution. When the tissue is homogenized in a Waring blender in the presence of the extracting solution, the homogenizing step has been found to be sufficiently thorough in as short a time as thirty seconds.

The solution used for extracting finely divided tissue in the process of our invention is a buffered aqueous alcohol solution. Ethanol or methanol may be the only alcohol in the extracting solution or a mixture of ethanol and methanol may be used. Alcohol or a mixture of alcohols may be present in the aqueous alcoholic extracting solution in an amount from about 5 to 20 percent by volume. If the concentration of alcohol in the extracting solution is less than about five percent by volume, the thromboplastic active material is not obtained in the extracting solution in a state which will allow satisfactory separation thereof from the unextracted residual tissue, and if the concentration of alcohol in the extracting solution is greater than about twenty percent by volume, the solubility of the thromboplastic active material in the extracting solution is significantly decreased. The aqueous alcohol solution is buffered at a pH within the range of from 5 to 8 but the preferred buffering range is 5.5 to 6.5. If the aqueous alcohol solution is buffered at a pH below 5, the amount of thromboplastic active material extracted from tissue is significantly decreased because its solubility in the extracting solution is markedly lower, and if the aqueous alcohol solution is buffered at a pH above 8, significant amounts of inactive tissue components are present in the extracting solution. It is necessary that an alkali metal salt of a low molecular weight amino acid, and preferably an alkali metal salt of an amino acid having not more than nine carbon atoms, such as alanine, glycine, proline or serine be present as an active part of the buffer system in an amount within the range of from 0.01 to 6.0 percent by weight of the buffered aqueous alcohol extracting solution; the preferred amount of low molecular weight amino acid is from one to two percent by weight. The presence in the extracting solution of the low molecular weight amino acid results in a significant increase in the amount of thromboplastic material extracted by the solution provided the amino acid is present in an amount within the range of from 0.01 to 6.0 percent by weight; if the amount is below this range, the increase in the amount of thromboplastic material extracted from tissue by the solution is not significant, and if the amount is above this range the material dissolved in the extracting solution results in a longer clotting time as measured by our modification of the Shapiro-Weiner method. Any acid buffer system effective over a pH range of 5 to 8 may be used to adjust the pH of the extracting solution. Specific acid buffer systems found suitable contain salts of acids such as phosphoric acid, amino acids, acetic acid and citric acid. An alkali metal hydroxide may be used in conjunction with the acid buffer systems to adjust the pH of the extracting solution to the desired level.

The amount of buffered aqueous alcohol solution used in the extraction may vary widely but for most efficient extraction of thromboplastin from the tissue it has been found desirable to use at least four milliliters of extracting solution for each gram of tissue to be extracted. The finely divided tissue in association with the buffered aqueous alcohol solution is thoroughly stirred at a temperature not above 25° C. and preferably not above 5° C. and centrifuged. The supernatant is filtered to remove any fat present and dialyzed against distilled water not above 25° C. preferably at a temperature not above 5° C. At a temperature above 25° C. a significant amount of thromboplastic active material is destroyed. The material which failed to pass through the membrane (the dialysate) contains highly active thromboplastin and may be used as such in determining prothrombin time or the solution may be lyophilized and the resulting solid material may be used in the determination.

In order that those skilled in the art may better understand how the present invention may be carried into effect the following examples are given by way of illustration and not by way of limitation.

Example I

Ten grams of ground, frozen rabbit lung and 20 ml. of an aqueous solution containing, per liter, 160 ml. of mixed alcohols, comprising a solution of methanol and ethanol prepared by adding 5 ml. of methanol to 95 ml. of 95 percent ethanol; 56 grams of glycine; 3.12 ml. of a solution of sodium glycinate, prepared by dissolving 4.5 grams of glycine and 2.0 grams of sodium hydroxide in 100 ml. of water; 4 ml. of 0.5 molar disodium hydrogen phosphate; and 2.76 ml. of 0.5 molar monosodium dihydrogen phosphate; were homogenized in a Waring blender at 5° C. for thirty seconds. After homogenization was complete, the blendor was washed out by stirring 20 ml. of the extracting solution therein for approximately 15 seconds, the washing solution was mixed with the homogenate and the whole was stirred for 90 minutes at 5° C. and centrifuged at −5° C. for thirty minutes. The supernatant was filtered through glass wool and dialyzed against distilled water at 5° C. The dialysate (the material which failed to pass through the membrane) was found capable of clotting oxalated rabbit plasma when our modification of the Shapiro-Weiner test was used. The dialysate was lyophilized and the thromboplastic activity of the solid obtained was determined by our modification of the Shapiro-Weiner method for determining prothrombin time of blood, which is described in a book entitled: "Coagulation, Thrombosis and Dicumarol," by Shapiro and Weiner, published in 1949 by the Brooklyn Medical Press, Brooklyn, New York.

A calcium-thromboplastin suspension was prepared in a test tube by adding 30 milligrams of lyophilized solid to 5 ml. of 0.85 per cent aqueous sodium chloride solution, admixing by inverting the tube 3 or 4 times until a uniform suspension was obtained, keeping the suspension in a water bath at 46–50° C. for twenty minutes, centrifuging, cooling the supernatant to room temperature, adding 0.1 ml. of 0.25 molar calcium chloride solution to 4 ml. of the suspension, mixing as above, and centrifuging again. Two-tenths ml. of the slightly turbid supernatant liquid was added to 0.1 ml. of fresh, oxalated rabbit plasma which had been prepared by the addition of 0.1 molar aqueous sodium oxalate solution to fresh rabbit blood in the proportion of one part sodium oxalate solution to nine parts of blood and centrifugation of the oxalated blood. The mixture of supernatant solution and oxalated plasma was agitated at 37° C. by tilting the test tube back and forth and timing the first appearance of a fibrin clot. Clot formation was detected in fourteen seconds after addition of the supernatant liquid to rabbit plasma.

Example II

Seventy-six grams of frozen rabbit brain and 1440 grams of frozen rabbit lung were homogenized at 5° C. for one minute in the presence of 7600 ml. of an aqueous solution containing per liter, 150 ml. of an alcoholic solution prepared by adding 7.5 ml. of methanol, 15 grams of glycine, 4.8 ml. of one molar aqueous sodium acetate solution, and 2.6 ml. of one molar aqueous acetic acid solution to 142.5 ml. of 95 percent ethanol. The homogenate was stirred for two hours at 5° C. and centrifuged at −5° C. for thirty minutes. The supernatant liquid was filtered, dialyzed against distilled water at 5° C. and the material which failed to pass through the dialysis membrane was lyophilized. Forty-four and forty-six hundredths grams of thromboplastic solid material were obtained. The thromboplastic activity of the solid obtained was determined by our modification of the Shapiro-Weiner procedure.

A calcium-thromboplastin suspension was prepared in a test tube by adding 25 milligrams of lyophilized solid to 5 ml. of 0.85 percent aqueous sodium chloride solution, admixing by inverting the tube 3 or 4 times until a uniform suspension was obtained, keeping the suspension in a water bath at 46–50° C. for twenty minutes, centrifuging, cooling the supernatant to room temperature, adding 0.1 ml. of 0.25 molar calcium chloride solution to 4 ml. of the suspension, mixing as above, and centrifuging again. Two-tenths ml. of the slightly turbid supernatant liquid was added to 0.1 ml. of fresh, oxalated human plasma which had been prepared by the addition of 0.1 molar aqueous sodium oxalate solution to fresh human blood in the proportion of one part sodium oxalate solution to nine parts of blood and centrifugation of the oxalated blood. The mixture of supernatant solution and oxalated human plasma was agitated at 37° C. by tilting the test tube back and forth and timing the first appearance of a fibrin clot. Clot formation was detected in twenty-five seconds after addition of the supernatant liquid to human plasma.

Example III

The procedure of Example II was repeated using the same amounts of tissue and extracting solution except that the extracting solution did not contain glycine. Twenty-nine and twenty-six hundredths grams of thromboplastic solid material were obtained. The thromboplastic activity of the solid was determined as in Example II and clot formation was detected in twenty-five seconds following the addition to fresh, oxalated, human plasma of a supernatant liquid prepared from the thromboplastic active material obtained.

It will be obvious to those skilled in the art that various changes may be made without departing from the spirit of the invention and therefore it is to be understood that the invention is not limited to what is described in the specification and examples but only as indicated in the appended claims.

This application is a continuation-in-part of our prior application Serial No. 285,307, filed April 30, 1952, for Preparation of Thromboplastin, now abandoned.

What is claimed is:

1. In a method for the preparation of thromboplastin, the steps which comprise; finely dividing rabbit tissues selected from the group consisting of brain and lung tissue, extracting the finely divided tissue with an aqueous solution, buffered at a pH within the range of 5–8, containing an alcohol selected from the class consisting of methanol and ethanol and mixtures thereof in the amount of 5–20 percent by volume and 0.01–6.0 percent by weight of an amino acid having not more than nine carbon atoms, separating the finely divided tissue from the extracting solution and dialyzing the extracting solution against distilled water.

2. A method according to claim 1 in which rabbit lung tissue alone is used.

3. A method according to claim 1 in which rabbit brain tissue alone is used.

4. In a method for the preparation of thromboplastin, the steps which comprise; finely dividing rabbit tissues selected from the group consisting of brain and lung tissue, extracting the finely divided tissue at a temperature not greater than 25° C., with an aqueous solution, buffered at a pH within the range of 5.5–6.5, containing an alcohol selected from the group consisting of methanol and ethanol and mixtures thereof in the amount of 5–20 percent by volume and 1–2 percent by weight of an amino acid having not more than nine carbon atoms, separating finely divided tissue from the extracting solution and dialyzing the extracting solution against distilled water at a temperature not greater than 25° C.

5. A method according to claim 4 in which rabbit lung tissue alone is used.

6. A method according to claim 4 in which rabbit brain tissue alone is used.

7. A method according to claim 4 in which the low molecular weight amino acid is glycine.

References Cited in the file of this patent

UNITED STATES PATENTS

| | | |
|---|---|---|
| 1,397,896 | Mills | Nov. 22, 1921 |
| 2,007,328 | Cole | July 9, 1935 |
| 2,162,863 | Ripke et al. | June 20, 1939 |
| 2,398,077 | Smith | Apr. 9, 1946 |

FOREIGN PATENTS

| | | |
|---|---|---|
| 698,136 | Germany | Oct. 3, 1940 |
| 111,145 | Sweden | Oct. 26, 1942 |

OTHER REFERENCES

Hardy: Chem. Abst., vol. 45, March 1951, p. 2046(a).

Scher: Am. J. Clin. Pathol., vol. 19, January 1949, p. 71.

Poncher: J. Lab. and Clin. Med., No. 27, December 1941, pp. 385–391 (p. 385 pert.).

UNITED STATES PATENT OFFICE

CERTIFICATE OF CORRECTION

Patent No. 2,842,480                                              July 8, 1958

Heron O. Singher et al.

It is hereby certified that error appears in the printed specification of the above numbered patent requiring correction and that the said Letters Patent should read as corrected below.

Column 1, line 27, after the word "prolonged" and before "time" insert -- prothrombin --.

Signed and sealed this 9th day of September 1958.

(SEAL)
Attest:

KARL H. AXLINE                                        ROBERT C. WATSON
Attesting Officer                                   Commissioner of Patents